March 6, 1962 — D. L. MORRISON — 3,023,586
PIPE DITCHING AND LAYING APPARATUS
Filed April 13, 1959 — 2 Sheets-Sheet 1
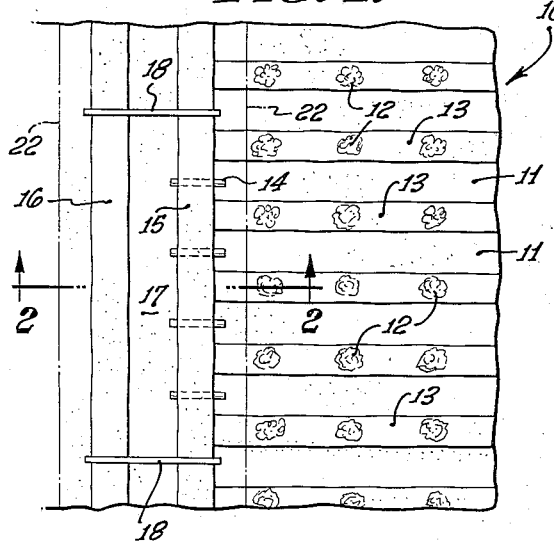
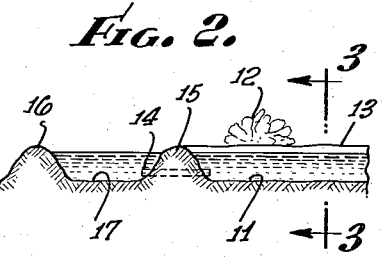
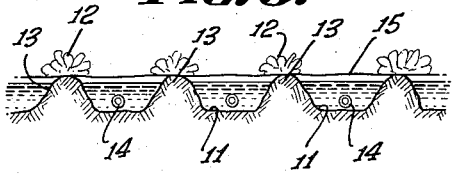
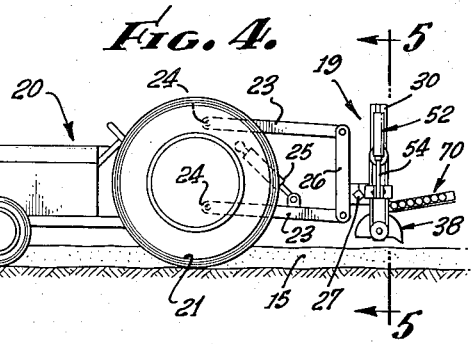
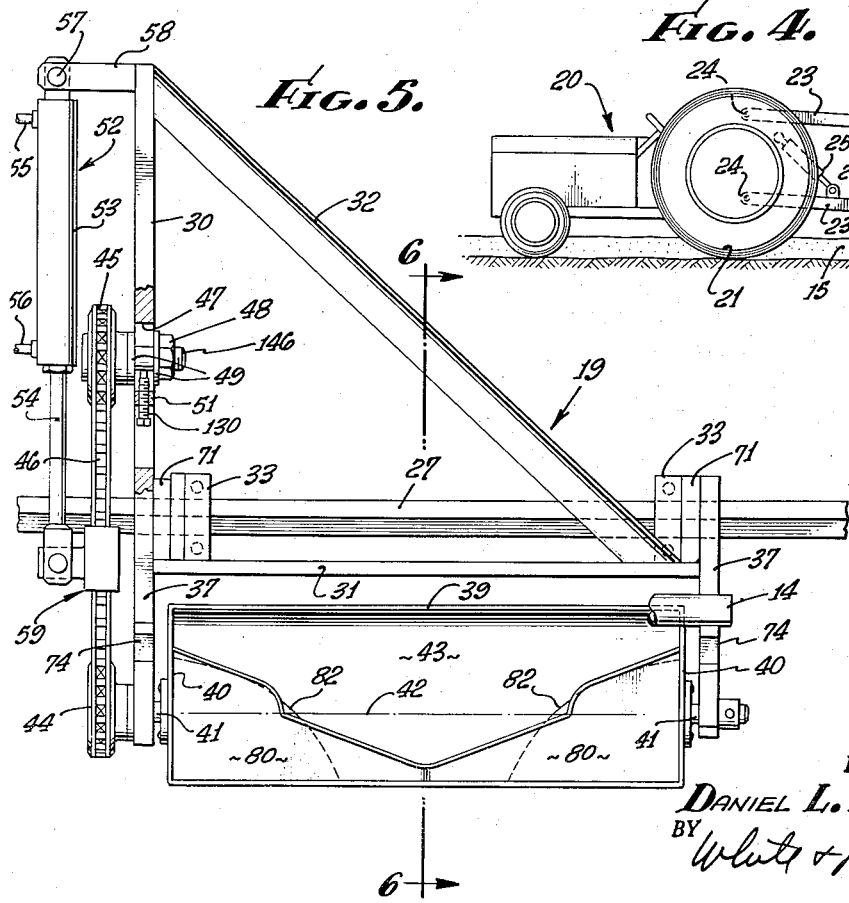
INVENTOR.
DANIEL L. MORRISON
BY
ATTORNEYS.

March 6, 1962 D. L. MORRISON 3,023,586
PIPE DITCHING AND LAYING APPARATUS
Filed April 13, 1959 2 Sheets-Sheet 2
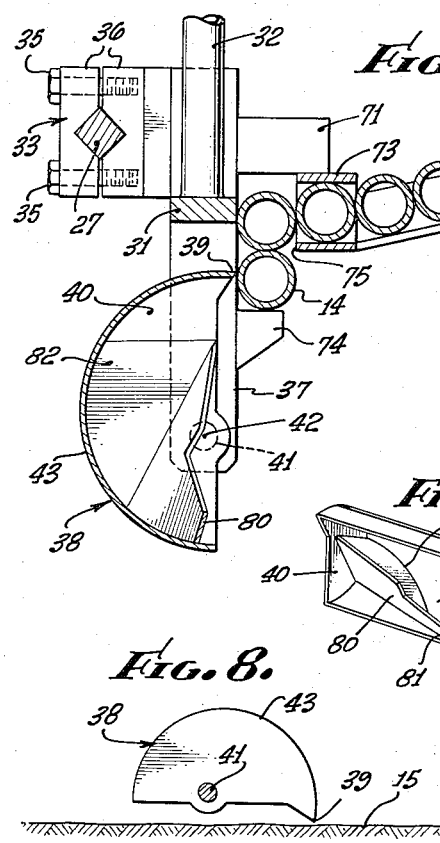
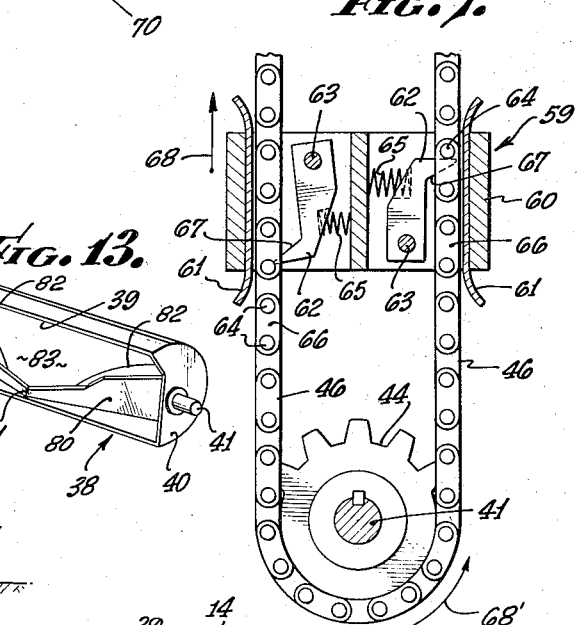
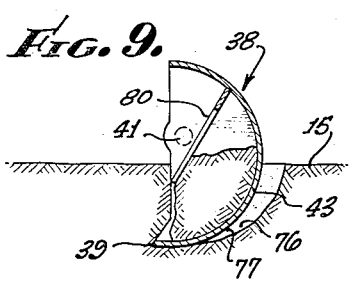
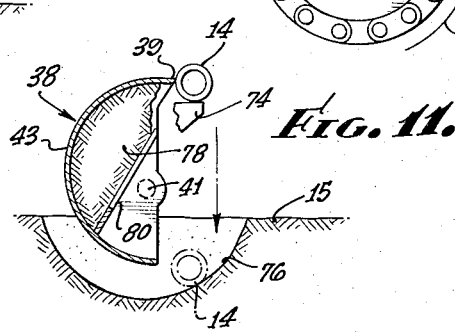
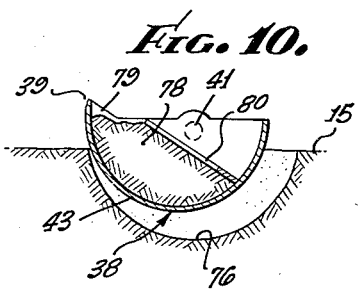
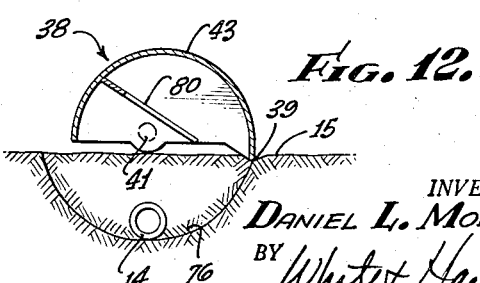
INVENTOR.
DANIEL L. MORRISON
BY *White & Haefliger*
ATTORNEYS.

United States Patent Office 3,023,586
Patented Mar. 6, 1962

3,023,586
PIPE DITCHING AND LAYING APPARATUS
Daniel L. Morrison, 1326 Thomas Way, Delano, Calif.
Filed Apr. 13, 1959, Ser. No. 806,026
9 Claims. (Cl. 61—72.1)

This invention relates generally to pipe laying apparatus, and more particularly concerns a novel apparatus and method for laying irrigation pipe in an earth bank so that the sections of pipe extend in parallel spaced apart relation and have their opposite ends exposed for passing irrigation water through the bank.

In the past, irrigation pipe sections have been laid in an earth bank entirely by manual labor. Since in general one pipe section is required for each furrow or irrigation ditch, and since cultivation along the furrows results in destruction of the earth bank and dislocation of the pipe sections therein, necessitating re-forming of the bank and re-setting of the pipe sections, it is readily seen that a great deal of hand labor is required for emplacing the necessary pipe sections during each growing season. Accordingly, it is a major object of the present invention to eliminate, in so far as possible, manual labor required for setting the pipe sections in earth banks, and also to speed up the pipe laying operation, resulting in a great saving of time and expense.

More specifically, the invention contemplates the provision of apparatus for embedding pipe in the earth comprising a rotary scoop operable to penetrate into the earth about a horizontal axis and to transfer earth into the scoop through a side opening therein so as to form a ditch, the apparatus also including means for supporting pipe to be delivered downwardly adjacent or in front of earth in the scoop in response to scoop rotation and before all the earth falls from the scoop through the opening therein, with the result that as the scoop rotates the pipe falls into the ditch and earth then falls from the scoop over the pipe. Baffle means are provided within the scoop interior for holding the earth from falling until the pipe falls into the ditch, the baffle preferably comprising plates projecting within the scoop interior and tapering centrally from opposite ends thereof toward the lengthwise extending rearward edge opposite the scoop forward cutting edge. Thus, the earth fall from the rotating scoop is concentrated centrally for building up the bank centrally over the pipe. As a result, the opposite ends of the pipe then project through the built up bank for passing water through a header ditch to a furrow.

The invention also contemplates that the means for delivering pipe includes a support for holding pipe in the path of scoop rotation so that the rotating scoop may disengage pipe from the support, thereby freeing it to fall into the ditch prior to the time that the scoop has rotated sufficiently to dump earth downwardly over the emplaced pipe.

Additional objects of the invention include the provision of actuator means including a power cylinder and ram and interengaged chain and sprocket means operable in response to relative linear movement of the ram and cylinder for rotating the scoop in the same rotary direction about a horizontal axis eccentric to the axis of the semi-cylindrical scoop. Preferably, the cylinder and ram are double acting, and a clutch carried by and movable with the ram is engageable with portions of the chain feeding onto it off a sprocket in response to opposite endwise reciprocation of the ram.

These and other features and objects of the invention, as well as the details of an illustrative embodiment, will be more fully understood from the following detailed description of the drawings, in which:

FIG. 1 is a plan view of a section of an irrigated field;

FIG. 2 is a section taken on line 2—2 of FIG. 1;
FIG. 3 is a section taken on line 3—3 of FIG. 2;
FIG. 4 is a side elevation showing a tractor vehicle traveling along an earth bank and transporting the apparatus for embedding pipe in the bank;
FIG. 5 is an enlarged elevation taken on line 5—5 of FIG. 4 showing the apparatus for laying pipe in the bank;
FIG. 6 is a section taken on line 6—6 of FIG. 5;
FIG. 7 is an enlarged end elevation taken through the clutch housing showing the clutch engagement with the chain drive for the apparatus;
FIG. 8 is an end elevation of the rotary scoop taken as the scoop begins its penetration downwardly into the earth bank;
FIG. 9 is a vertical section through the scoop as it rotates in the ground;
FIG. 10 is a view similar to FIG. 9 showing the scoop as it emerges from the ground;
FIG. 11 is a view similar to FIG. 10 showing the scoop as it rotates to the position in which it disengages an irrigation pipe section;
FIG. 12 is a view similar to FIG. 11 showing the scoop after it has rotated to the position in which all the dirt has fallen into the ditch and over the pipe which has dropped therein; and
FIG. 13 is a perspective view showing the interior construction of the scoop.

Referring first to FIGS. 1 through 4, the portion of the irrigated field 10 shown includes laterally extending furrows 11 between which rows of plants 12 grow on earth banks 13 separating the furrows. Water is delivered to the furrows 11 through pipe sections 14 extending laterally through an earth bank 15 running longitudinally at the ends of and crosswise to the furrows 11. There is also an earth bank 16 laterally spaced from bank 15 forming therewith a header ditch 17 within which irrigation water is retained between dams 18 for delivery through the pipe sections 14 to the furrows as water is supplied to the header ditch 17 above the level of the pipe sections. The latter are seen in FIG. 2 to have their opposite ends exposed to the water in ditch 17 and furrows 18, with the bank 15 formed above the pipe sections and cresting generally midway of their lengths.

It will be understood that the pipe sections 14 are mechanically emplaced in position as shown in FIG. 1 by the apparatus 19 shown in outline in FIG. 4 and transported by a vehicle such as a tractor 20, the large rear wheels 21 of which are adapted to run longitudinally at the outsides of the earth banks 15 and 16 and generally along paths as indicated by the broken lines 22 in FIG. 1. As the tractor body runs along and over the earth bank 15, the apparatus 19 is lowered at appropriate intervals to form ditches in the earth bank 15 for embedding the pipe sections 14.

The lowering mechanism includes parallel arms 23 pivoted at 24, and a suitable actuator 25 connected to the lower arm for swinging the latter about its pivot connection 24. The two arms are interconnected by an additional arm 26 to form a parallelogram assembly characterized in that the arms 26 and the laterally extending diamond shaped bar 27 carried thereby remain angularly oriented in space as they are lifted and lowered by the actuator 25 and arms 23.

Extending the description to FIGS. 5 through 7, the apparatus 19 is shown to include upright, horizontal and diagonal frame members 30 through 32 which are mounted on laterally extending diamond bar by means of clamps 33 best illustrated in FIG. 6. Cap screws 35 interconnect opposite sections 36 of clamps 33 about the diamond bar 27 for rapidly attaching the frame thereto, so that the frame also remains angularly oriented in space, as viewed in FIG. 4, as it is lifted and lowered relative to the earth bank 15 within which the pipe sections 14 are to be emplaced.

The frame also includes downwardly extending hangers or arms 37 which are laterally spaced apart as seen in FIG. 5 for supporting a rotary scoop 38 directly below the cross member 31. The scoop is generally semi-cylindrical and has a side opening through which earth is transferred to the scoop upon rotation thereof with the scoop cutting edge 39 penetrating into the earth, as illustrated by the sequential showing of FIGS. 9 through 12 to be described in detail. Opposite end plates 40 of the scoop carry laterally extending stub axles 41 which are received through the hanger arms 37 and supported thereby, such arms comprising one form of carriage means for the scoop. The stub axles 41 define the scoop axis of rotation 42 which is seen in FIGS. 5 and 6 to be eccentric with respect to the geometrical axis of the semi-cylindrical scoop plate 43.

Rotary drive is transmitted to the scoop by means of a pair of sprockets 44 and 45 and a chain 46 extending about the sprockets. Sprocket 44 is keyed to stub axle 41, while sprocket 45 rotates on an axle 146 carried by the frame member 30 and projecting laterally through an opening 47 therethrough. Axle 146 is retained in laterally extending parallel relation to stub axle 41 by the nut and washer parts 48 and 49 bearing against the frame member 30. When it is desired to tighten or loosen the chain or the sprocket, the nut 48 is loosened slightly and an adjustment set screw 130 through a frame cross piece 51 is turned to lift or lower the loosened stub axle 46 as the case may be, after which the nut 48 is tightened to hold the axle 46 and sprocket 45 in desired spaced relation relative to sprocket 44.

Drive is transmitted to the chain 46 for rotating the rotary scoop 38 by an actuator 52 which included a double acting power cylinder 53 and ram 54 to which hydraulic or pneumatic fluid is delivered and removed through ports 55 and 56 at opposite ends of the cylinder. The latter is pinned at 57 to a lug 58 mounted rigidly on the frame member 30, while the ram 54 is connected to a clutch indicated at 59.

The clutch is partly shown in FIG. 7 to include a housing 60 mounting chain guides 61 which are operable to lead the chain 46 relatively through the housing 60 as the latter is lifted and lowered in response to operation of the actuator. Also, provided within the housing 60 are two oppositely extending latch dogs 62 pivoted at locations 63 so that the hook ends of the dogs are adapted to swing into and out of the spaces between the chain rivets indicated at 64. A pair of compression springs 65 urge the hook ends of the dogs forward into interengaging relation with the chain links 66 between the rivets 64. However, the tapered inner sides 67 of the dog ends are adapted to be cammed away from the chain in response to engagement with the rivets as the latter are moved against the tapered sides 67 of the latch dogs. As a result, when the clutch housing 60 and latch dogs are moved upwardly as indicated by the arrow 68, the left latch dog 62, shown in FIG. 7, is disengaged from the chain whereas the right latch dog 62 is engaged with and lifts the side of the chain running off the sprocket 44, whereby the latter is turned counterclockwise for turning the scoop 38. Alternately as the clutch housing 60 is lowered, the left latch dog 62 now engages the chain whereas the right latch dog is disengaged therefrom and ratchets over the rivets 64, with the result that the chain still moves off the sprocket 44 in the direction of the arrow 68'. Therefore, the scoop is always rotated in the same rotary direction in response to double acting or opposite reciprocation of the actuator mechanism 52.

Referring now to FIG. 6, there is shown a pipe rack 70 supported at 71 by the frame cross piece 31, the rack including arms 72 supporting the sections of pipe 14 to extend horizontally and laterally directly over the earth bank 15. The arms 72 have upward angularity relative to horizontal so that the pipe sections 14 gravitate downwardly toward the discharge end 73 of the rack, from which the pipe sections spill and are retained as viewed in FIG. 6 with one pipe section supported by laterally extending lugs 74 on the hangers or arms 37 as also seen in FIG. 5. The scoop 38 contains a plate baffle 80 which tapers from opposite ends thereof toward the center at 81, all as better illustrated in FIG. 13. Also, as shown, the plate baffle projects from the semi-cylindrical scoop blade 43 with diminished extent into the interior of the scoop in the directions from opposite ends of the scoop toward the center 81. Two additional curved baffle plates 82 are provided, these extending from opposite ends of the scoop 38 in curved planes toward the center of the scoop interiorly of the plate baffle 80. The effect of these baffle plates 80 and 82 is to direct the earth fall from the interior 83 of the scoop through the scoop side opening 79 and toward the center of the bank 15 as the scoop rotates from the position shown in FIG. 11 to the position shown in FIG. 12, so that as illustrated in FIG. 2, more earth is piled up over the center of the pipe section 14 than at opposite ends of the pipe. Thus, the bank is re-formed to the same shape it had prior to excavation of the ditch 76 by the scoop.

FIG. 11 shows the interengagement of the scoop edge 36 with a pipe section 14, which results in dropping of the pipe off the support 74 and into the ditch 76 where the pipe therein rolls into the lowermost regions of the ditch as illustrated in FIG. 12. The lugs 74 or their equivalents constitute means for supporting the pipe to be delivered downwardly adjacent the scoop and in the path of scoop rotation. Falling of the pipe into the ditch is followed by the earth fall into the scoop during its continuous rotation to its final position shown in FIG. 12. Thus, the pipe which has fallen into the ditch is at once covered with the earth fall from the scoop as the ditch is re-formed to the cross sectional shape shown in FIG. 2.

Scoop rotation throughout 360° is affected in response to opposite stroking of the ram 54, as described. Therefore, the ram effective length need be only one half of what it would otherwise have to be, were the scoop to be rotated 360° in response to a single downward or upward stroke of the ram.

Following a ditching cycle, the scoop is elevated by the parallelogram mechanism including arms 23 and 26 and the actuating mechanism 25, and the tractor 20 is advanced until the scoop arrives over the next location at which a pipe section is to be embedded in the bank 15. It is apparent that pipe sections 14 may be rapidly embedded in the bank without requiring manual digging and rebuilding thereof and that the work may be done much more rapidly by the powered mechanism described.

I claim:

1. Apparatus for embedding pipe in the earth, comprising rotary structure including a rotary scoop, a carriage for the scoop, and actuator means for rotating said structure about a substantially horizontal axis causing the scoop to penetrate into the earth as the scoop rotates about said axis and to fill earth into the scoop so as to form a ditch, means for delivering pipe to and supporting pipe in the path of a leading portion of said rotary structure so that the pipe is delivered downwardly in response to structure rotation, and baffle means carried by the scoop for retaining earth therein until the scoop has rotated sufficiently for the pipe to fall into the ditch before all the earth falls from the scoop.

2. The invention as defined in claim 1 in which the scoop is horizontally elongated and semi-cylindrical, having a forward cutting edge and an elongated side opening through which earth fills into the scoop.

3. The invention as defined in claim 1 including a wheeled vehicle supporting said carriage so that the scoop is free to overlie an earth bank.

4. The invention as defined in claim 1 in which said baffle means comprise plates projecting within the scoop interior and tapering centrally from opposite ends of the scoop toward the rearward lengthwise extending edge thereof opposite said forward cutting edge, whereby the earth fall from the rotating scoop is concentrated beneath the central portion of the scoop.

5. The invention as defined in claim 1 in which said carriage includes a frame supporting the scoop for vertical bodily displacement relative to the surface of the earth into which the scoop is adapted to penetrate.

6. The invention as defined in claim 5 in which said pipe delivery means includes a support carried by said frame for holding a pipe in the path of scoop rotation so that the scoop may disengage the pipe from the support freeing the pipe to fall into the ditch.

7. The invention as defined in claim 6 in which said pipe delivery means includes a rack carried by said frame for delivering a plurality of pipes in sequence to said support.

8. The invention as defined in claim 6 in which said actuator means includes a power cylinder and ram relatively movable linearly by fluid pressure in the cylinder, and interengaged chain and sprocket means operable in response to relative linear movement of said ram and cylinder for rotating said scoop.

9. The invention as defined in claim 8 in which said cylinder and ram are double acting and in which said actuator means includes a clutch carried by and movable with one of said ram and cylinder and engageable with portions of said chain feeding onto and off one sprocket in response to opposite linear relative displacements respectively of said ram and cylinder.

References Cited in the file of this patent

UNITED STATES PATENTS

| | | |
|---|---|---|
| 616,382 | Wilgus | Dec. 20, 1898 |
| 1,340,836 | Powell | May 18, 1920 |
| 1,792,855 | McRae | Feb. 17, 1931 |
| 2,671,283 | Sights | Mar. 9, 1954 |
| 2,743,687 | Hopkins | May 1, 1956 |
| 2,780,376 | Sanders | Feb. 5, 1957 |
| 2,876,717 | Tetyak | Mar. 10, 1959 |